(No Model)
S. S. BLACK.
COOKING UTENSIL.
No. 586,005. Patented July 6, 1897.
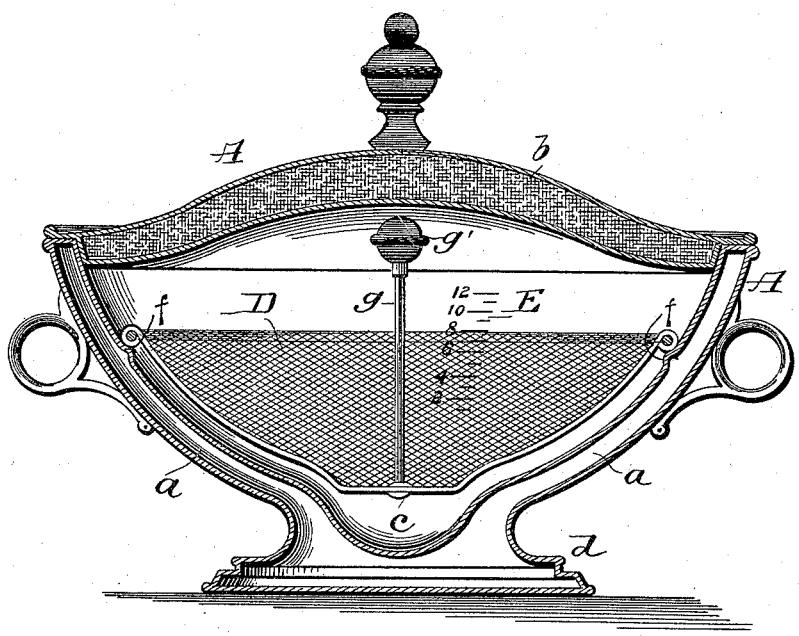
Witnesses
E. J. Nottingham
G. F. Downing
Inventor
S. S. Black
By H. A. Seymour
Attorney

UNITED STATES PATENT OFFICE.

STEPHEN S. BLACK, OF PASADENA, CALIFORNIA.

COOKING UTENSIL.

SPECIFICATION forming part of Letters Patent No. 586,005, dated July 6, 1897.

Application filed April 4, 1895. Serial No. 544,439. (No model.)

*To all whom it may concern:*

Be it known that I, STEPHEN S. BLACK, of Pasadena, in the county of Los Angeles and State of California, have invented certain new and useful Improvements in Cooking Utensils; and I do hereby declare the following to be a full, clear, and exact description of the invention, such as will enable others skilled in the art to which it appertains to make and use the same.

My invention relates to an improvement in cooking utensils or dishes, and more particularly to such as are adapted for cooking eggs in the unbroken shell.

It is well known that in an ordinary boiled egg the white is tough and leathery and comparatively indigestible, while the yolk may be entirely uncooked and have a raw taste. It is a difficult matter to get eggs cooked to the right consistency, as they must be removed from the water promptly at the expiration of a certain number of minutes.

The object of my invention is to provide a utensil or dish in which a limited number of hens' eggs can be cooked to just the proper degree without the possibility of being overcooked and without the necessity of removing them from their water-bath at any specified time, thereby dispensing with the aid of any horological instrument whatever, saving time and painstaking on the part of the cook and much fault-finding on the part of the consumer.

A further object is to produce a utensil or dish for the purpose stated which shall be simple in construction, comparatively cheap to manufacture, easy to handle and operate, and which shall be effectual in all respects in the performance of its functions.

With these objects in view the invention consists in certain novel features of construction and combinations and arrangements of parts, as hereinafter set forth, and pointed out in the claims.

The accompanying drawing represents a sectional view of a device embodying my improvements.

A represents my improved utensil, which is preferably made of metal and in the form of a covered dish suitable to be placed on a dining-table.

While the utensil might be made of a single thickness of material, I prefer to make it with double walls, so as to form an intermediate chamber $a$ between said walls for the reception of air, whereby to retain heat within the device. The chamber $a$ between the walls of the device may be filled with some non-conductor of heat, such as pulverized carbon, wood fiber, paper, wool, felt, &c., if desired.

By constructing the receptacle with a double wall it has an increased capacity for holding and retaining heat, and consequently the size of vessel necessary to cook a certain number of eggs is reduced to a minimum.

The cover $A'$ of the device is intended to retain heat therein and may be made of a single thickness of non-conducting material, but I prefer to make it of sheet metal with an inner and an outer shell to form a chamber $b$ for the reception of non-conducting material or air.

The dish or utensil has substantially the internal form shown, the shape being such that the capacity of the dish below a given point is exactly proportioned to hold just the required quantity of hot water to cook a predetermined number of eggs, and the amount of water necessary is determined by a gage E, having figures thereon to indicate the exact amount of boiling water needed to properly cook the eggs. The gage may be engraved on the inside of the dish or on a separate piece and placed within the dish.

A tray D, made of woven wire, (or perforated metal,) is removably located within the dish and supported above the bottom thereof by means of a flange $f$, projecting from the tray and resting against the interior of the dish. The tray may be provided with a stem $g$, having a knob $g'$ whereby to lift it.

The tray D is designed to suspend eggs above the bottom of the dish, so that they will be evenly surrounded by water contained in the dish.

In using the cooker above described place the eggs in the tray, lift the tray, and pour into the dish boiling water directly from the boiler or kettle until the surface reaches the line on the gage corresponding to the number of eggs in the tray. Then immediately replace the tray, put the cover on, and set the dish on the dining-table. In a few minutes the eggs will be perfectly cooked, jellied throughout like a well-cooked custard, the white of the eggs being equally as tender. There is not heat enough in the quantity of water used to overcook the eggs, so they may be left in the hot bath indefinitely or until needed, and are thus warm for latecomers. Should the eggs get cold, they may be recooked by exactly the same process. The same degree and amount of heat will not cause any further coagulation of the albumen, but will simply warm it up again, so that if eggs are left over at one meal they can be recooked at the next, and so that no epicure can tell by his sense of taste whether a certain egg cooked by my improved device has been cooked once or twice.

Eggs cooked in the manner above described seem to have their sulfurous compounds eliminated, as they do not produce sulfurous eructation, nor do they seem to discolor silverware as much as do ordinary boiled eggs. This effect is probably due to the comparatively long exposure to a moderate heat.

My improvements are simple in construction, cheap to manufacture, handy to use, ornamental in appearance, and effectual in all respects in the performance of their functions.

Having fully described my invention, what I claim as new, and desire to secure by Letters Patent, is—

1. As an article of manufacture, an egg-cooker comprising a graduated receptacle having a basin-like or flaring interior so shaped that the capacity of the receptacle below a given point is proportioned to the amount of hot water required to cook a predetermined number of eggs, substantially as set forth.

2. As an article of manufacture, an egg-cooker comprising a graduated receptacle having a basin-like or flaring interior so shaped that the capacity of the receptacle below a given point is proportioned to the amount of hot water required to cook a predetermined number of eggs, and means for retaining the heat in the receptacle whereby the size of a vessel required to hold an adequate amount of water to cook each egg is reduced to a minimum, substantially as set forth.

3. As an article of manufacture, an egg-cooker comprising a graduated receptacle having a basin-like or flaring interior so shaped that the capacity of the receptacle below a given point is proportioned to the amount of hot water required to cook a predetermined number of eggs, and a removable tray shaped to substantially conform to the interior shape of the receptacle, substantially as set forth.

In testimony whereof I have signed this specification in the presence of two subscribing witnesses.

STEPHEN S. BLACK.

Witnesses:
O. P. FOOTE,
KATE S. BLACK.